US010603764B2

(12) United States Patent
Meyer

(10) Patent No.: US 10,603,764 B2
(45) Date of Patent: Mar. 31, 2020

(54) BURNISHING TOOL AND METHOD OF MANUFACTURING THE SAME

(71) Applicant: General Electric Company, Schenectady, NY (US)

(72) Inventor: Kevin William Meyer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 15/606,348

(22) Filed: May 26, 2017

(65) Prior Publication Data

US 2018/0339398 A1  Nov. 29, 2018

(51) Int. Cl.
| | |
|---|---|
| *B24B 53/095* | (2006.01) |
| *B24B 39/02* | (2006.01) |
| *B24B 49/08* | (2006.01) |
| *B24B 55/04* | (2006.01) |
| *B24B 55/02* | (2006.01) |
| *C21D 7/08* | (2006.01) |
| *B24B 39/04* | (2006.01) |

(52) U.S. Cl.
CPC ............ *B24B 53/095* (2013.01); *B24B 39/02* (2013.01); *B24B 39/023* (2013.01); *B24B 39/04* (2013.01); *B24B 49/08* (2013.01); *B24B 55/02* (2013.01); *B24B 55/045* (2013.01); *C21D 7/08* (2013.01); *B24B 55/04* (2013.01)

(58) Field of Classification Search
CPC ..... B24B 53/095; B24B 39/023; B24B 49/08; B24B 55/045; B24B 55/02; B24B 39/04; B24B 39/02; B24B 55/04; C21D 7/08
See application file for complete search history.

(56) References Cited

U.S. PATENT DOCUMENTS

| | | | |
|---|---|---|---|
| 3,945,098 A | 3/1976 | Yascheritsyn et al. | |
| 4,574,442 A | 3/1986 | Dickinson et al. | |
| 5,826,453 A | 10/1998 | Prevey, III | |
| 6,415,486 B1 | 7/2002 | Prevey, III | |
| 7,513,121 B2 * | 4/2009 | Zurecki | B23P 25/003 62/64 |
| 7,530,792 B2 | 5/2009 | Luna et al. | |
| 8,024,846 B2 | 9/2011 | Luna et al. | |
| 8,051,565 B2 | 11/2011 | Luna et al. | |

(Continued)

FOREIGN PATENT DOCUMENTS

| | | |
|---|---|---|
| SU | 919855 A2 | 4/1982 |
| SU | 1038203 A2 | 8/1983 |

OTHER PUBLICATIONS

Extended European Search Report and Opinion issued in connection with corresponding EP Application No. 18174160.4 dated Oct. 31, 2018.

*Primary Examiner* — John C Hong
(74) *Attorney, Agent, or Firm* — Dority & Manning, P.A.

(57) ABSTRACT

A burnishing tool and a method of additively manufacturing components of the burnishing tool are provided. The burnishing tool includes a burnishing element for burnishing a workpiece. The burnishing element is positioned between an upper nozzle and a lower nozzle which are additively manufactured to define a plurality of internal fluid passageways for receiving, distributing, and discharging a burnishing fluid to facilitate cooling and/or lubrication of the burnishing element and/or the workpiece.

20 Claims, 10 Drawing Sheets

(56) References Cited

U.S. PATENT DOCUMENTS

| | | |
|---|---|---|
| 8,601,659 B2 | 12/2013 | Prevey et al. |
| 9,283,650 B2 | 3/2016 | Prevey et al. |
| 9,427,833 B2 | 8/2016 | Feldmann |
| 9,498,856 B2 | 11/2016 | Feldmann |
| 9,573,184 B2 | 2/2017 | Hawkes et al. |
| 2013/0260168 A1 | 10/2013 | Slavik et al. |
| 2014/0007349 A1 | 1/2014 | Haas et al. |
| 2014/0130321 A1 | 5/2014 | Prevey et al. |
| 2015/0165515 A1 | 6/2015 | Hawkes et al. |
| 2016/0097287 A1 | 4/2016 | Goldfinch et al. |

\* cited by examiner

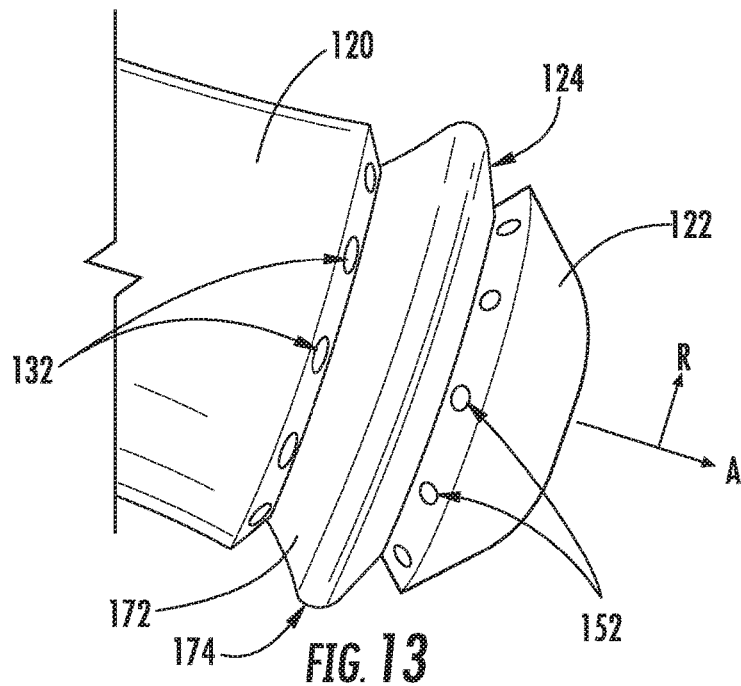
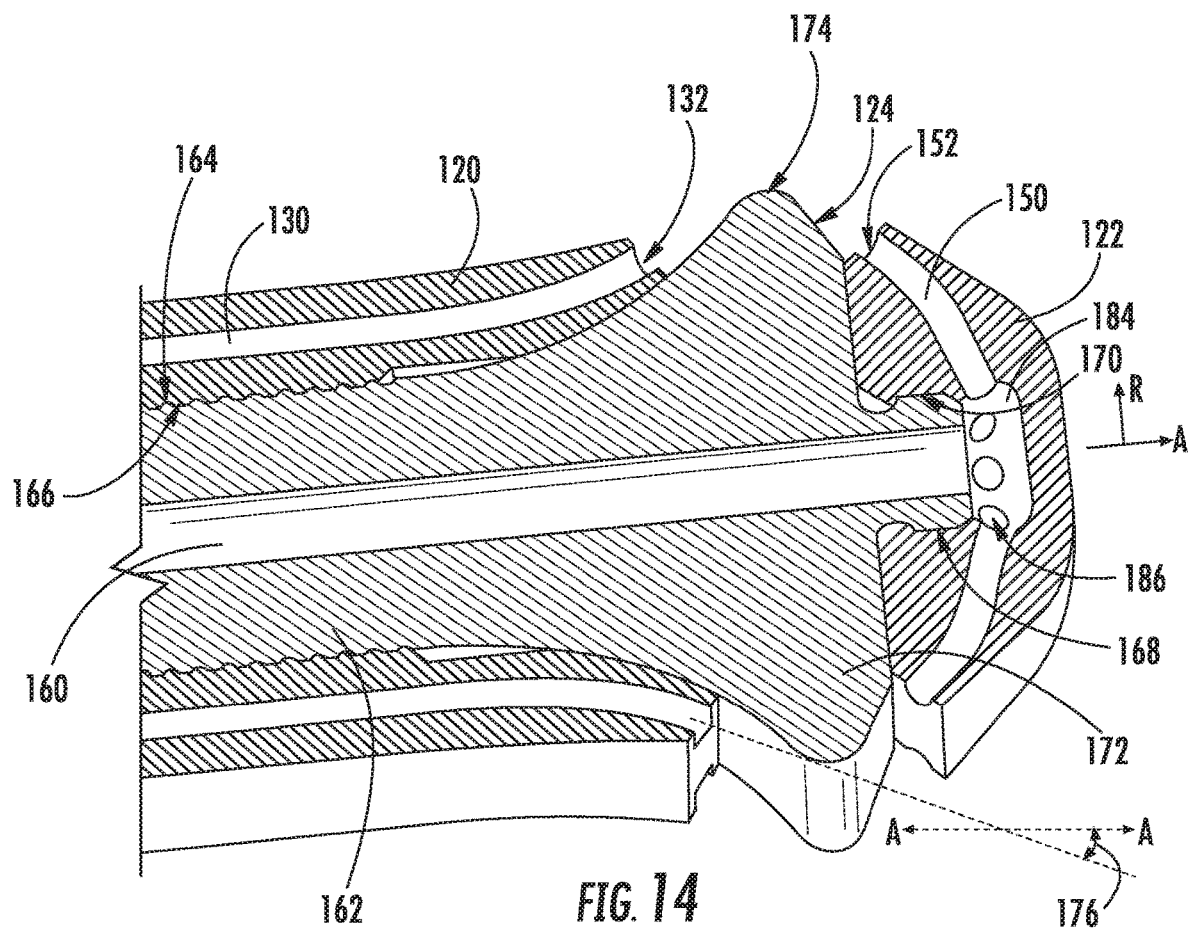

BURNISHING TOOL AND METHOD OF MANUFACTURING THE SAME

FIELD

The present subject matter relates generally to burnishing tools, and more particularly, to burnishing tools including additively manufactured components defining internal fluid passageways to facilitate cooling and/or lubrication.

BACKGROUND

Burnishing is a process by which compressive stresses are introduced into a surface layer of a workpiece using a burnishing tool, e.g., to improve the surface finish and the physical properties of the workpiece. Burnishing tools generally include a ball roller, cylindrical roller, or another contact element or working tip which is pressed into the workpiece until the material in the contact region plastically deforms. Notably, the deformation of the material and friction between the workpiece and the burnishing tool generate a substantial amount of heat, which can generate undesirable thermal stresses in the workpiece and/or prematurely wear the burnishing tool. Therefore, certain burnishing tools include systems for supplying burnishing fluid to the burnishing zone.

However, conventional burnishing fluid supply systems are complex and often require multiple parts resulting in more complicated assembly, increased costs, and decreased reliability. For example, a burnishing tool may include a separate, dedicated fluid supply system including a large number of fluid manifolds, supply conduits, support structures, spray nozzles, and other parts that extend toward the contact region and provide a flow of burnishing fluid to the region. Each of these parts must be individually positioned, oriented, and connected to the supporting structure and the burnishing tool, e.g., via brazing, welding, or another joining method. The manufacturing time and costs associated with the assembly of such a burnishing tool and burnishing fluid system are very high and the likelihood of fluid leaks between the manifolds and conduits is increased due to the number of joints formed. In addition, manufacturing restrictions limit the number, size, configuration, and position of fluid distribution systems and manifolds that may be included with the burnishing tool.

Accordingly, a burnishing tool with an improved burnishing fluid system would be useful. More specifically, a burnishing tool including burnishing fluid passageways that improve cooling and/or lubrication performance and simplify manufacturing and assembly would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a burnishing tool is provided including an upper nozzle defining a lower supply channel and a plurality of upper cooling channels, each of the upper cooling channels terminating in an upper discharge port. A lower nozzle defines a plurality of lower cooling channels, each of the lower cooling channels terminating in a lower discharge port. A burnishing element is positioned between the upper nozzle and the lower nozzle, the burnishing element defining a flow passageway providing fluid communication between the lower supply channel and the lower cooling channels.

In another exemplary aspect of the present disclosure, a method for manufacturing a burnishing tool is provided. The method includes depositing a layer of additive material on a bed of an additive manufacturing machine and selectively directing energy from an energy source onto the layer of additive material to fuse a portion of the additive material and form an upper nozzle defining a lower supply channel and a plurality of upper cooling channels, each of the upper cooling channels terminating in an upper discharge port. The method also includes depositing a layer of additive material on a bed of an additive manufacturing machine and selectively directing energy from an energy source onto the layer of additive material to fuse a portion of the additive material and form a lower nozzle defining a plurality of lower cooling channels, each of the lower cooling channels terminating in a lower discharge port. A burnishing element is positioned between the upper nozzle and the lower nozzle, the burnishing element defining a flow passageway providing fluid communication between the lower supply channel and the lower cooling channels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 13 is a perspective view of a working tip of the exemplary burnishing tool of FIG. 11 according to an exemplary embodiment of the present subject matter.

FIG. 14 is a cross-sectional view of the exemplary working tip of FIG. 13 according to an exemplary embodiment of the present subject matter.

Figure 1:
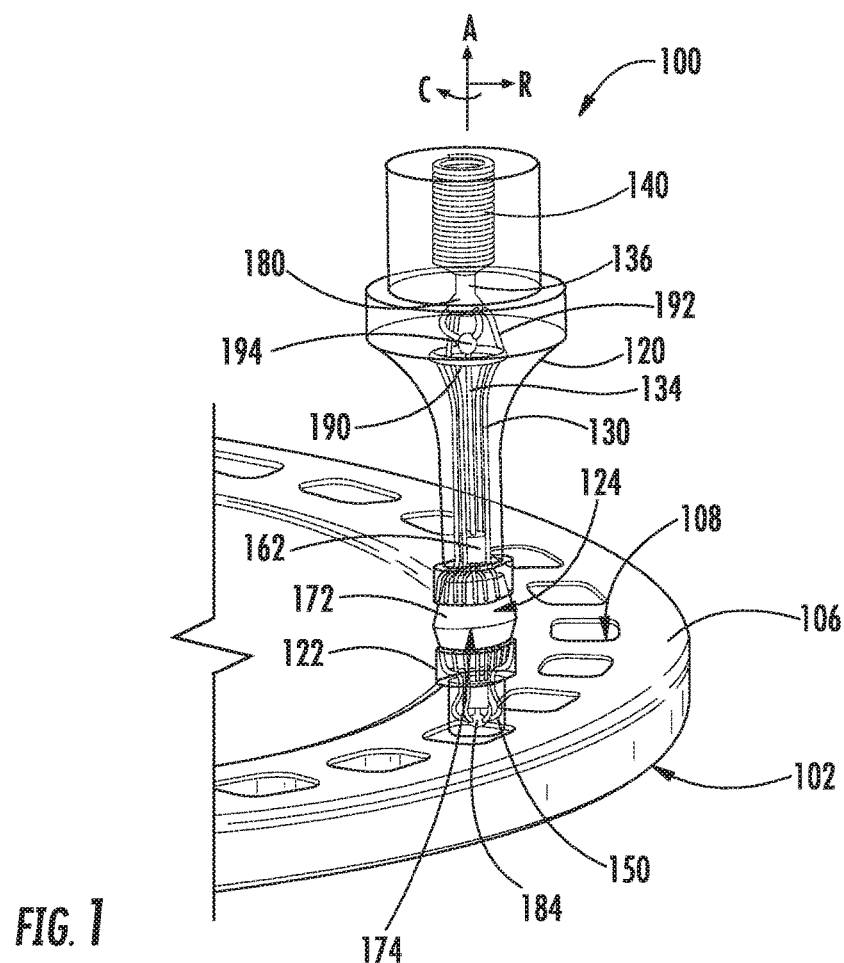
FIG. 1 is a perspective view of an exemplary burnishing tool burnishing a workpiece according to an exemplary embodiment of the present subject matter, with portions of the burnishing tool illustrated as transparent to facilitate the illustration of internal fluid passageways.
Figure 2:
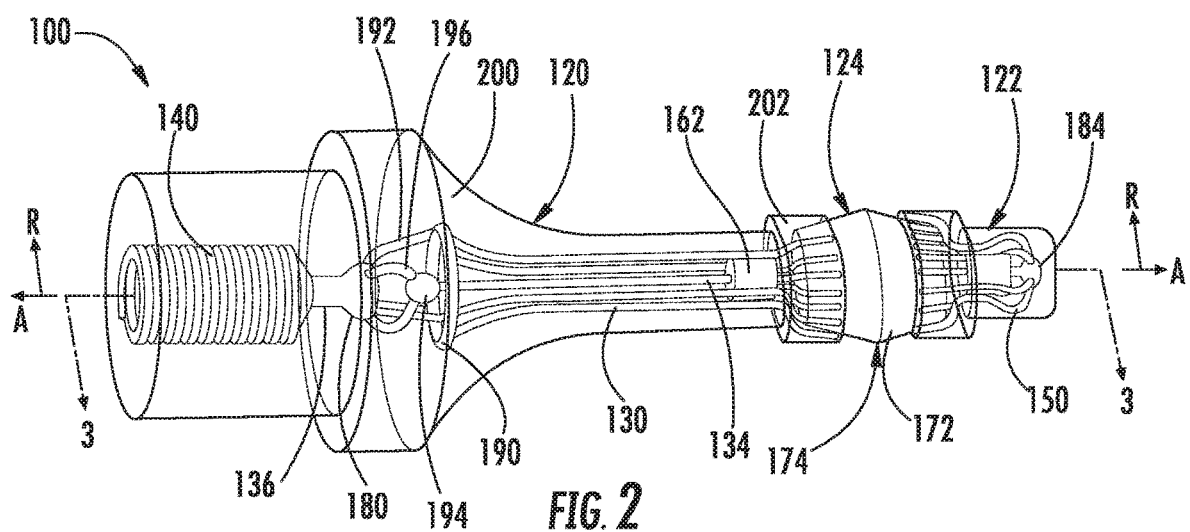
FIG. 2 is another perspective view of the exemplary burnishing tool of FIG. 1, with portions of the burnishing tool illustrated as transparent to facilitate the illustration of internal fluid passageways.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

The present disclosure is generally directed to a burnishing tool and a method of additively manufacturing components of the burnishing tool. The burnishing tool includes a burnishing element for burnishing a workpiece. The burnishing element is positioned between an upper nozzle and a lower nozzle which are additively manufactured to define a plurality of internal fluid passageways for receiving, distributing, and discharging a burnishing fluid to facilitate cooling and/or lubrication of the burnishing element and/or the workpiece.

Referring now generally to FIGS. 1 through 14, a burnishing tool 100 is described according to various embodiments of the present subject matter. Burnishing tool 100 is generally configured for burnishing a workpiece 102 according to exemplary embodiments of the present subject matter. However, it should be appreciated that burnishing tool 100 is described herein according to exemplary configurations or embodiments only for the purpose of explaining aspects of the present subject matter. Modifications and variations may be made to burnishing tool 100 while remaining within the scope of the present subject matter.

In general, the exemplary embodiments of burnishing tool 100 described herein may be manufactured or formed using any suitable process. However, in accordance with several aspects of the present subject matter, burnishing tool 100 may include components formed using an additive-manufacturing process, such as a 3-D printing process. The use of such a process may allow these components to be formed integrally, as a single monolithic component, or as any suitable number of sub-components. In particular, the manufacturing process may allow these components to be integrally formed and include a variety of features not possible when using prior manufacturing methods. For example, the additive manufacturing methods described herein enable the manufacture of components having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laser jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based super alloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central axis of the component (e.g., the axial direction A) or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Referring now generally to FIGS. 1 through 5, burnishing tool 100 will be described according to an exemplary embodiment of the present subject matter. Although several embodiments of burnishing tool 100 are described herein, similar elements and features will be described using the same reference numerals. Burnishing tool 100 generally defines an axial direction A, a radial direction R, and a circumferential direction C disposed about the axial direction A. For clarity, not all portions of burnishing tool 100 are illustrated in the figures. For example, throughout the figures, portions of burnishing tool 100 are illustrated as transparent to facilitate the illustration of internal fluid passageways as described herein.

Figure 3:
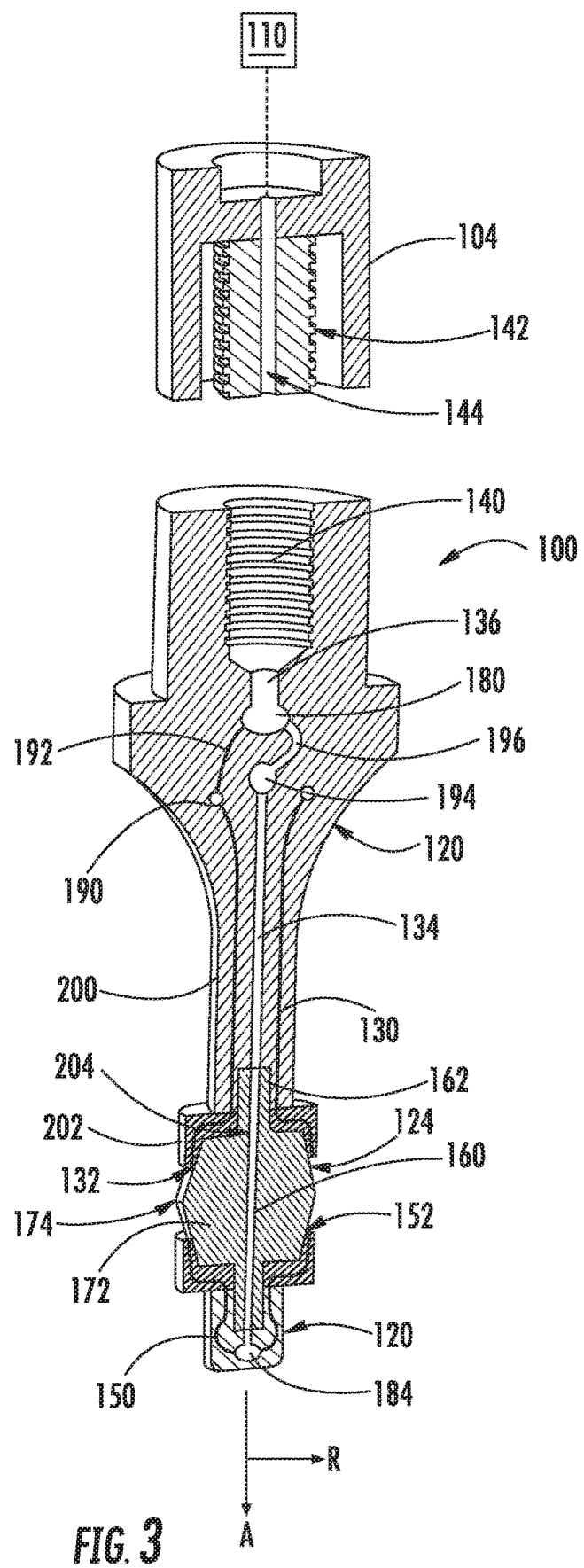
FIG. 3 provides a cross-sectional view of the exemplary burnishing tool of FIG. 1, taken along Line 3-3 of FIG. 2.

As illustrated schematically in FIG. 3, burnishing tool 100 is generally connected to a tool holder 104 that moves burnishing tool 100 as necessary to perform the burnishing operation. For example, according to one exemplary embodiment, workpiece 102 is a disk 106 defining a plurality of apertures 108. In such an embodiment, tool holder 104 translates burnishing tool along the circumferential direction C around disk 106 and into and out of apertures 108 along the axial direction A to perform the burnishing operation to the surface of each aperture 108. Because the burnishing operation generates a large amount of heat, a burnishing fluid supply system is used to provide a burnishing fluid onto disk 106 or onto burnishing tool 100 proximate a contact region. In this regard, for example, tool holder 104 may also be in fluid communication with a burnishing fluid supply 110 that is placed in fluid communication with burnishing tool 100. Burnishing fluid supply 110 may contain any suitable burnishing fluid for use in the burnishing process. For example, the burnishing fluid could be a water-based coolant, oil, chilled air, spray oil, liquid nitrogen, liquid carbon dioxide, other suitable coolants, or some combination thereof.

As illustrated, burnishing tool 100 generally includes an upper nozzle 120, a lower nozzle 122, and a burnishing element 124. Upper nozzle 120 is coupled to tool holder 104 and extends along the axial direction A. Burnishing element 124 is coupled to upper nozzle 120 and lower nozzle 122 is coupled to burnishing element 124 such that burnishing element 124 is positioned between upper nozzle 120 and lower nozzle 122. During a burnishing operation, burnishing element 124 contacts workpiece 102 and upper nozzle 120 and lower nozzle 122 provide a flow of burnishing fluid onto workpiece 102 and/or burnishing element 124 proximate a contact region.

Referring generally to FIGS. 1 through 5, various features of upper nozzle 120, lower nozzle 122, and burnishing element 124 will be described according to an exemplary embodiment. For example, upper nozzle 120 defines a plurality of upper cooling channels 130 that extend substantially along the axial direction A. Each of upper cooling channels 130 terminates in an upper discharge port 132 that is positioned proximate burnishing element 124. In addition, upper nozzle 120 defines a lower supply channel 134 that extends substantially along the axial direction A to provide a flow of burnishing fluid to lower nozzle 122, as described in more detail below.

Upper cooling channels 130 and lower supply channel 134 are both in fluid communication with an inlet channel 136 that is defined by upper nozzle 120 and is in fluid communication with burnishing fluid supply 110 for receiving the flow of burnishing fluid. For example, as best illustrated in FIG. 3, upper nozzle 120 defines a threaded inlet bore 140 that is configured to engage a complementary threaded portion 142 of tool holder 104. Threaded portion 142 of tool holder 104 defines a central bore 144 that provides fluid communication between burnishing fluid supply 110 and inlet channel 136. In this manner, a flow of burnishing fluid may be supplied from burnishing fluid supply 110, through central bore 144 and inlet channel 136, and to upper cooling channels 130 and lower supply channel 134. Similarly, lower nozzle 122 defines a plurality of lower cooling channels 150 that extend substantially along the axial direction A. Each of lower cooling channels 150 terminates in a lower discharge port 152 that is positioned proximate burnishing element 124.

As explained above, burnishing element 124 is positioned between and operably couples upper nozzle 120 and lower nozzle 122. Referring still to FIGS. 1 through 5 and also to FIG. 10, burnishing element 124 defines a flow passageway 160 providing fluid communication between lower supply channel 134 and lower cooling channels 150. More specifically, burnishing element 124 generally includes a spindle 162 defining an upper attachment portion, such as an upper threaded portion 164 for engaging an upper threaded bore 166 defined by upper nozzle 120 and a lower attachment portion, such as a lower threaded portion 168 for engaging a lower threaded bore 170 defined by lower nozzle 122. As illustrated, flow passageway 160 is defined through spindle 162 and extends along the axial direction A. It should be appreciated that although the upper and lower attachment portions are illustrated herein as threaded spindles received within threaded bores, other attachments methods may be used according to alternative embodiments, e.g., friction fit, brazing, retention pins, etc.

Burnishing element 124 further includes a burnishing body 172 positioned around spindle 162 between upper threaded portion 164 and lower threaded portion 168. Burnishing body 172 generally extends outward from spindle 162 along the radial direction R to define a working tip 174. Working tip 174 is generally configured for contacting and burnishing workpiece 102. Because the largest temperatures are experienced by workpiece 102 and burnishing element 124 proximate the contact region between the two, cooling channels 130 and 150 can direct the flow of burnishing fluid toward that region. For example, according to exemplary embodiments, upper discharge ports 132 are positioned on one side of workpiece 102 and spray toward workpiece 102 along a first direction while lower discharge ports 152 are positioned on the opposite side of workpiece 102 and spray toward workpiece 102 along a second direction.

More specifically, for example, upper discharge ports 132 and lower discharge ports 152 define a discharge angle 176 (see FIG. 9) defined relative to the axial direction A. Discharge angle 176 is selected such that the flow of burnishing fluid is directed onto working tip 174 of burnishing element 124. For example, as illustrated herein, discharge angle 176 may be between about 20 and 70 degrees, or about 45 degrees according to exemplary embodiments. Other suitable discharge angles for directing the flow onto working tip 174 are possible and within the scope of the present subject matter.

Upper nozzle 120 may further include various features for ensuring a proper distribution of burnishing fluid among the various internal reservoirs, channels, and fluid passageways. For example, according to an exemplary embodiment, it is desirable to split the flow of burnishing fluid in half, delivering one half to upper cooling channels 130 and the other half to lower cooling channels 150 through lower supply channel 134. By adjusting the sizes and configurations of the various internal fluid flow features, any suitable distribution of burnishing fluid may be achieved.

For example, according to the illustrated embodiment, to achieve the proper distribution of burnishing fluid, upper nozzle 120 defines an upper distribution reservoir 180 in fluid communication with inlet channel 136. Upper distribution reservoir 180 defines a plurality of outlets 182 in fluid communication with upper cooling channels 130 and lower supply channel 134. Any suitable number and size of outlets 182 may be provided to split the flow of burnishing fluid between upper cooling channels 130 and lower supply channel 134 in the desired manner.

Similarly, according to the illustrated embodiment, lower nozzle 122 defines a lower distribution reservoir 184 in fluid communication with flow passageway 160. Lower distribution reservoir 184 defines a plurality of outlets 186 in fluid communication with lower cooling channels 150. In this manner, a portion of the flow of burnishing fluid may pass from upper distribution reservoir 180, through lower supply channel 134 and flow passageway 160, into lower distribution reservoir 184, and through outlets 186 to lower cooling channels 150.

In order to ensure an even distribution of the flow of burnishing fluid about the circumferential direction C, upper nozzle 120 can further define an annular distribution ring 190 fluidly coupled to upper cooling channels 130 and a plurality of upper distribution channels 192 providing fluid communication between upper distribution reservoir 180 and annular distribution ring 190. For example, as illustrated, upper nozzle 120 defines three upper distribution channels 192 spaced equidistantly around the circumferential direction C and extending between upper distribution reservoir 180 and annular distribution ring 190 to evenly supply the flow of burnishing fluid. The burnishing fluid is further distributed around annular distribution ring 190 before passing through upper cooling channels 130.

In addition, according to the illustrated embodiment, upper nozzle 120 defines a collection chamber 194 fluidly coupled to lower supply channel 134 and a plurality of lower distribution channels 196 providing fluid communication between upper distribution reservoir 180 and collection chamber 194. According to an exemplary embodiment, collection chamber 194 is configured for receiving a portion of the flow of burnishing fluid from one or more lower distribution channels 196 and collecting that burnishing fluid before supplying it through lower supply channel 134. It should be appreciated that the embodiments described herein illustrate a specific number, size, position, and orientation of fluid reservoirs, collections chambers, distribution channels, and other fluid passageways for the purpose of explaining aspects of the present subject matter. Other configurations are possible while remaining within the scope of the present subject matter.

As illustrated in FIGS. 1 through 5, burnishing body 172 has a non-circular cross-section taken along a plane defined orthogonal to the axial direction A. In this manner, burnishing body 172 may be used for burnishing non-circular features, such as apertures 108 of disk 106 as illustrated in FIG. 1. However, because burnishing body 172 cannot rotate relative to upper nozzle 120 or lower nozzle 122, multi-part upper and lower nozzles 120, 122 are used herein according to an exemplary embodiment.

Figure 4:
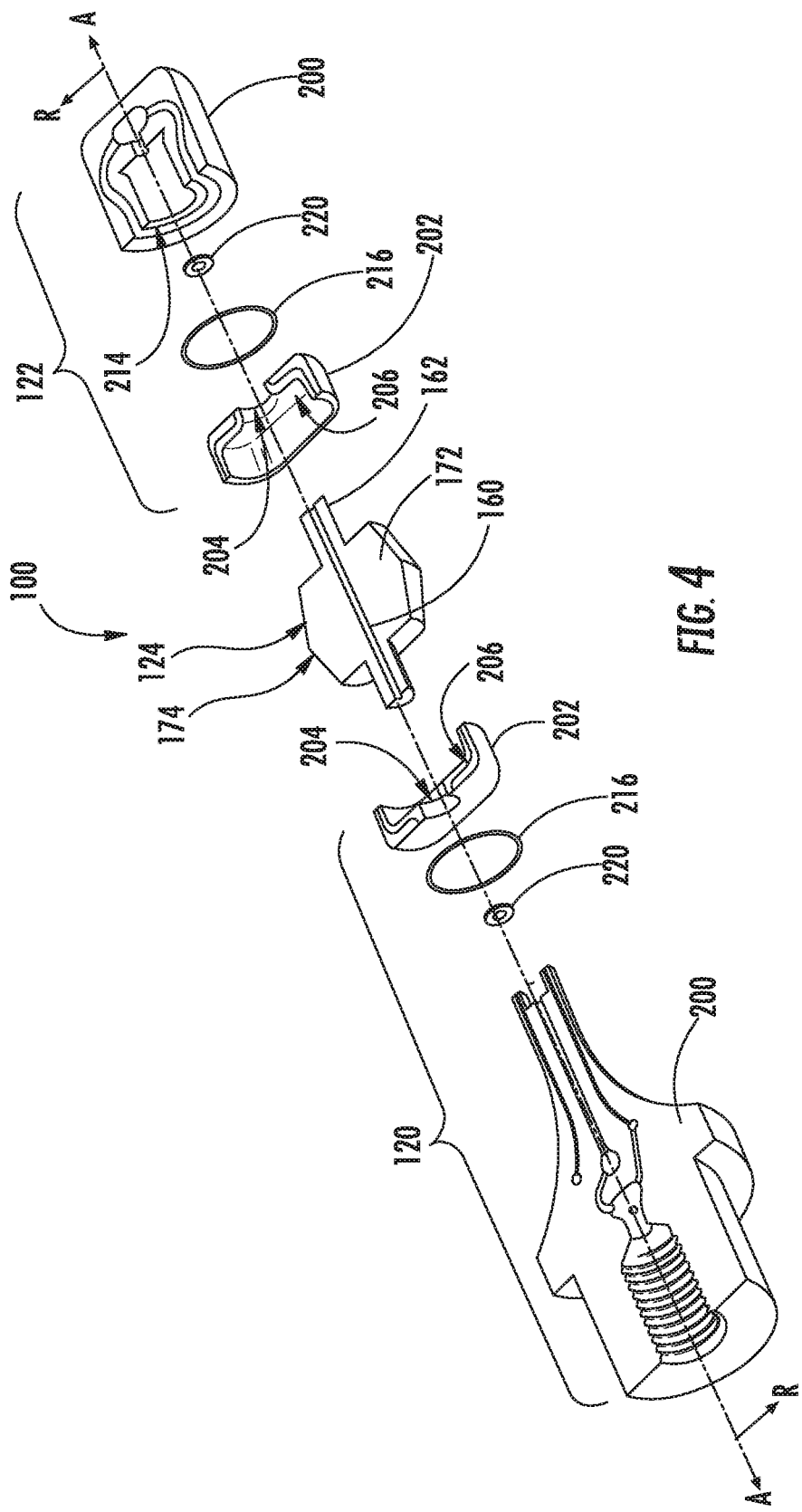
FIG. 4 provides an exploded, perspective cross-sectional view the exemplary burnishing tool of FIG. 1.
Figure 5:
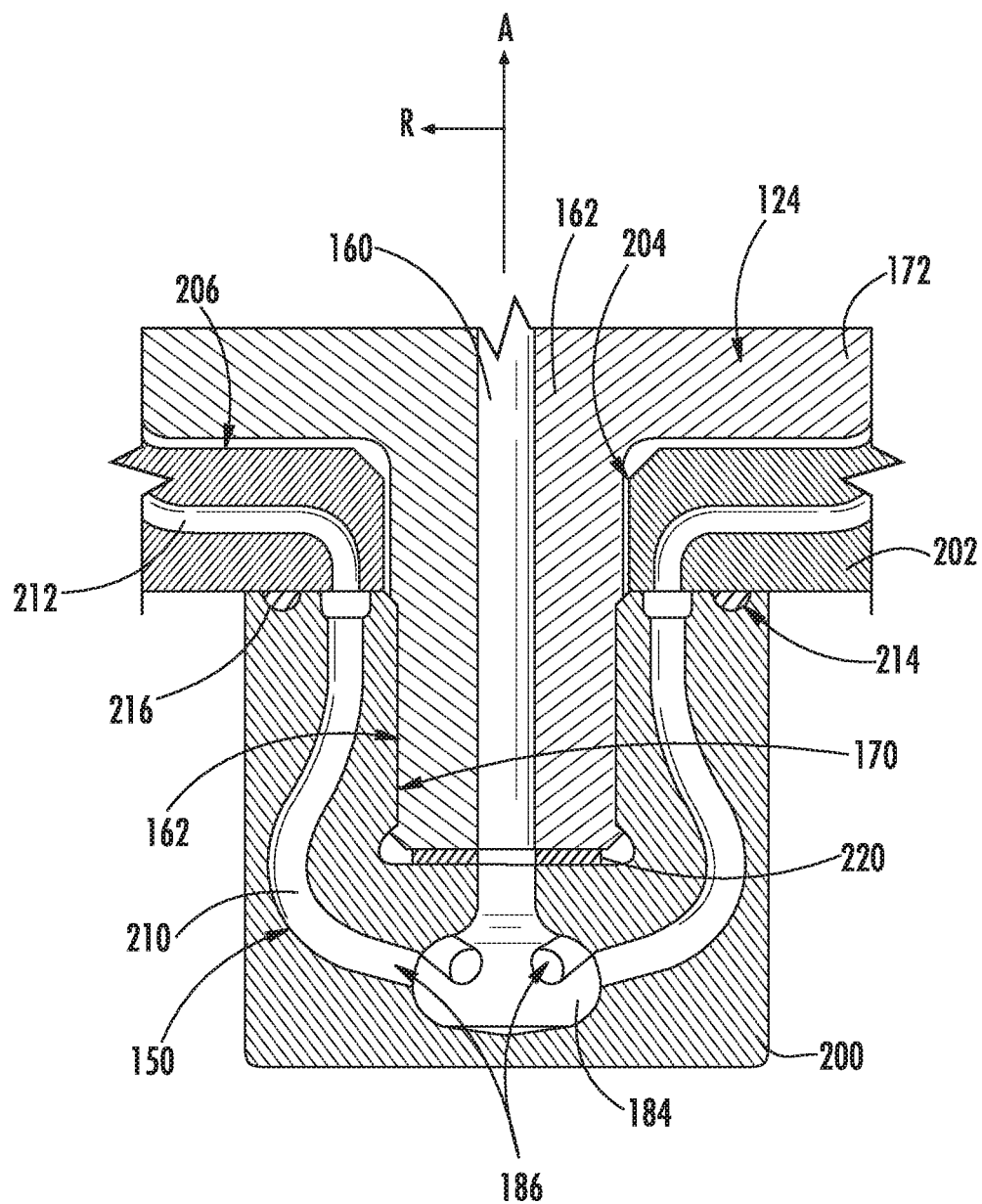
FIG. 5 provides a cross-sectional view of a lower nozzle of the exemplary burnishing tool of FIG. 1.

For example referring now specifically to FIGS. 4 and 5, upper nozzle 120 includes a first piece 200 defining upper threaded bore 166 for engaging upper threaded portion 164 of spindle 162. In addition, upper nozzle 120 includes a second piece 202 positioned between first piece 200 and burnishing body 172. Second piece 202 defines a central bore 204 and a non-circular cavity 206. When upper nozzle 120 is assembled, upper threaded portion 164 of spindle 162 extends through central bore 204 and into upper threaded bore 166 for securing burnishing element 124 to upper nozzle 120. In addition, non-circular cavity 206 is complementary to and configured for receiving burnishing body 172 such that burnishing body 172 cannot rotate relative to second piece 202.

Notably, when upper nozzle 120 is split into two pieces 200 and 202, upper cooling channels 130 are also split into two segments. More specifically, a first segment 210 of each upper cooling channel 130 is defined in first piece 200 and a second segment 212 of each upper cooling channel 130 is defined in second piece 202. Because cooling channels 130 are spaced apart along the circumferential direction C and the first piece 200 and second piece 202 rotate relative to each other during assembly, an annular groove 214 is defined within first piece 200 or second piece 202 to provide fluid communication between the various first segments 210 and second segments 212. To prevent leaks between first piece 200 and second piece 202, one or more seals, e.g., an annular seal 216 is positioned around annular groove 214 between first piece 200 and second piece 202.

In addition, burnishing tool 100 may include additional fluid seals positioned to prevent fluid leaks between components of burnishing tool 100. For example, a fluid seal, e.g., an O-ring 220, may be positioned within upper threaded bore 166 between a distal end of spindle 162 and upper nozzle 120 to provide a fluid seal between lower supply channel 134 and flow passageway 160. Although the construction of upper nozzle 120 is described above, it should be appreciated that lower nozzle 122 may be similarly constructed, as is indicated by the similar reference numerals in the figures.

Figure 6:
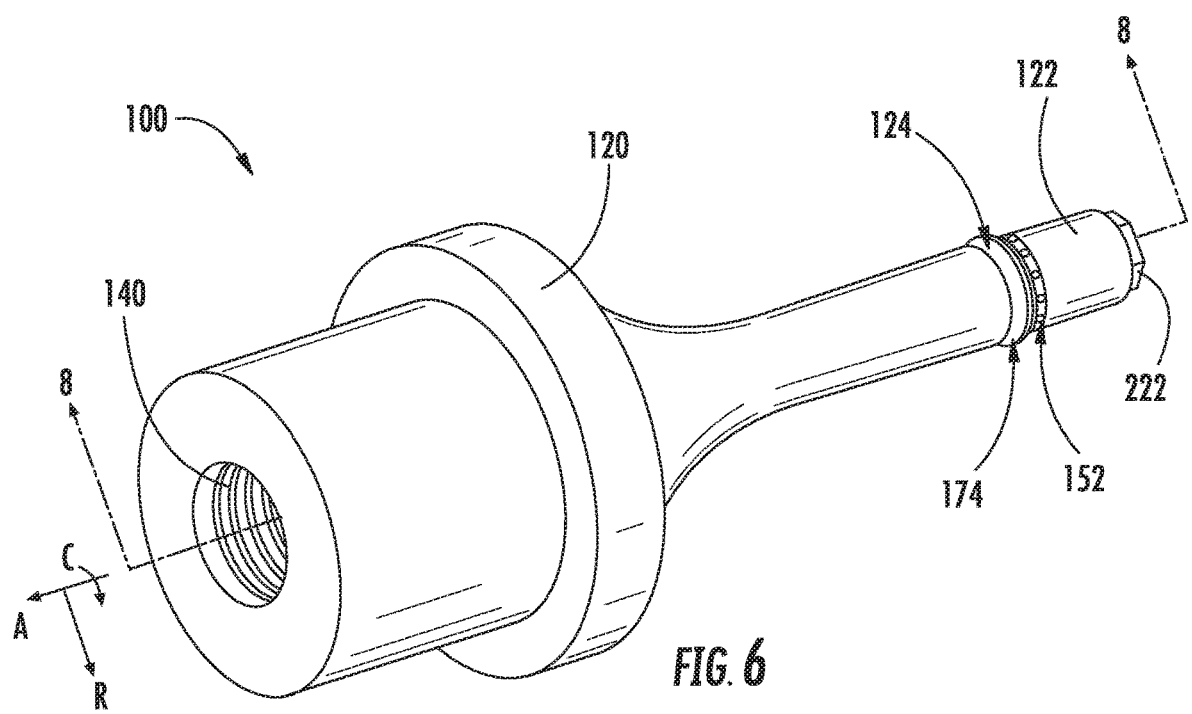
FIG. 6 provides a perspective view of a burnishing tool according to another exemplary embodiment of the present subject matter.
Figure 7:
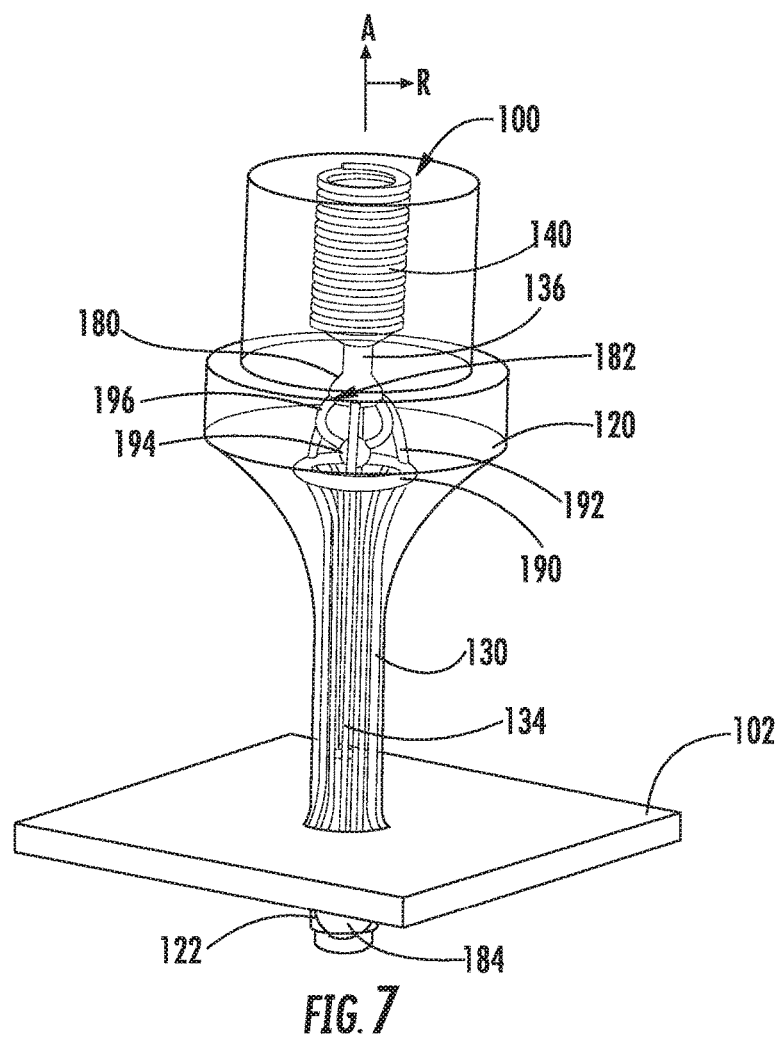
FIG. 7 is another perspective view of the exemplary burnishing tool of FIG. 6 burnishing a workpiece according to an exemplary embodiment of the present subject matter, with portions of the burnishing tool illustrated as transparent to facilitate the illustration of internal fluid passageways.
Figure 8:
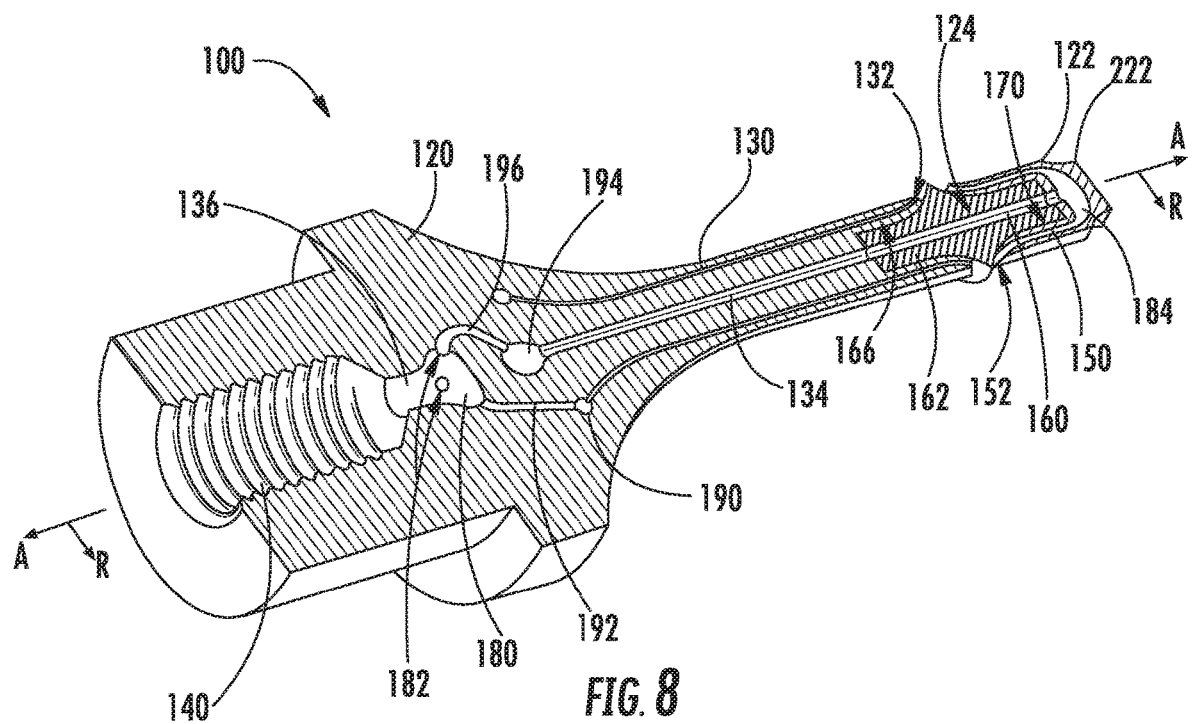
FIG. 8 provides a cross-sectional view of the exemplary burnishing tool of FIG. 6, taken along Line 8-8 of FIG. 6.
Figure 9:
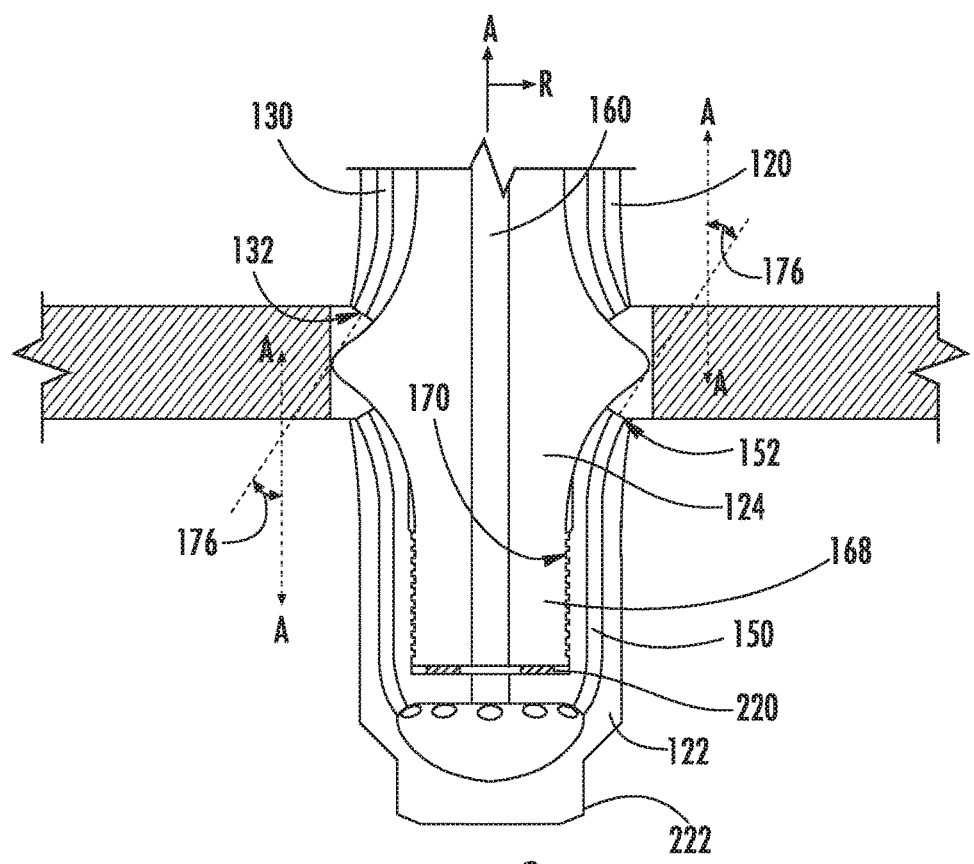
FIG. 9 provides a cross-sectional view of the exemplary burnishing tool of FIG. 6 burnishing a workpiece.
Figure 10:
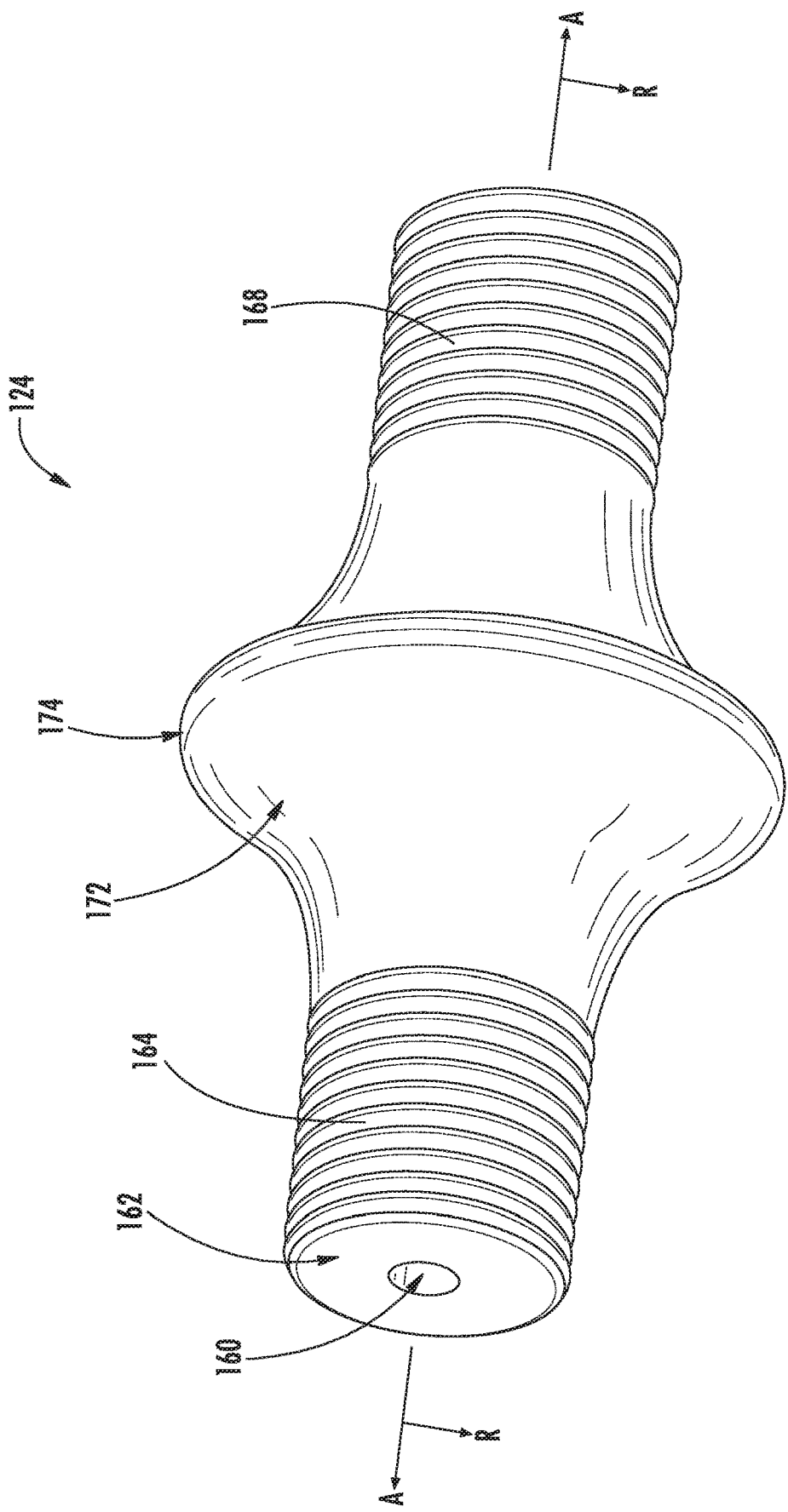
FIG. 10 is a perspective view of a burnishing element that may be used with the exemplary burnishing tool of FIG. 6 according to an exemplary embodiment of the present subject matter.

According to another exemplary embodiment illustrated in FIGS. 6 through 10, burnishing body 172 has a circular cross-section taken along a plane defined orthogonal to the axial direction A. In this manner, upper nozzle 120 and lower nozzle 122 may each be additively manufactured as single, integral, and monolithic pieces which may be attached to burnishing element 124 through a simple threaded connection. In addition, as illustrated in FIG. 6, lower nozzle 122 may be additively manufactured to define a hex head 222, which enables use of a socket wrench or another suitable tool for tightening upper nozzle 120, lower nozzle 122, and burnishing element 124.

Figure 11:
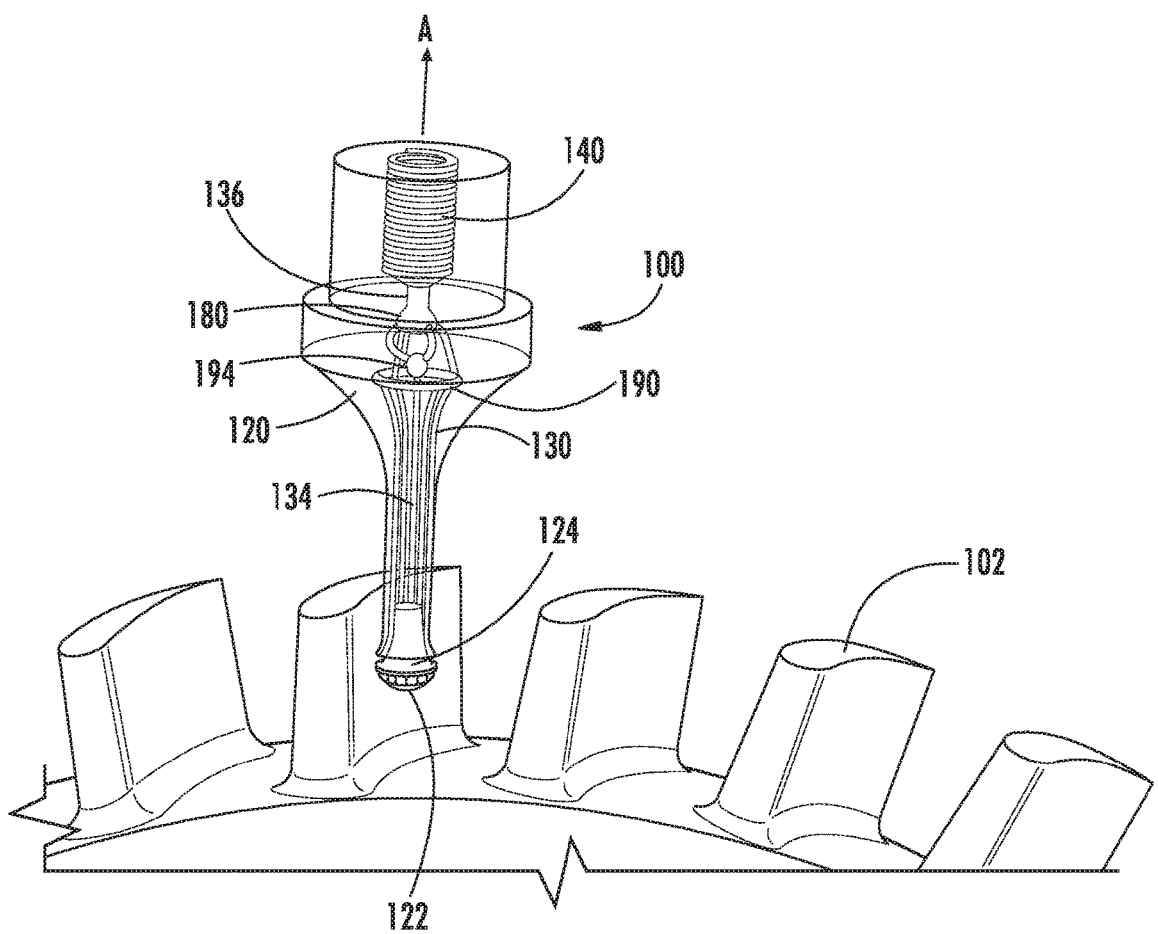
FIG. 11 is a perspective view of a burnishing tool burnishing a turbine blade of a gas turbine engine according to an exemplary embodiment of the present subject matter, with portions of the burnishing tool illustrated as transparent to facilitate the illustration of internal fluid passageways.
Figure 12:
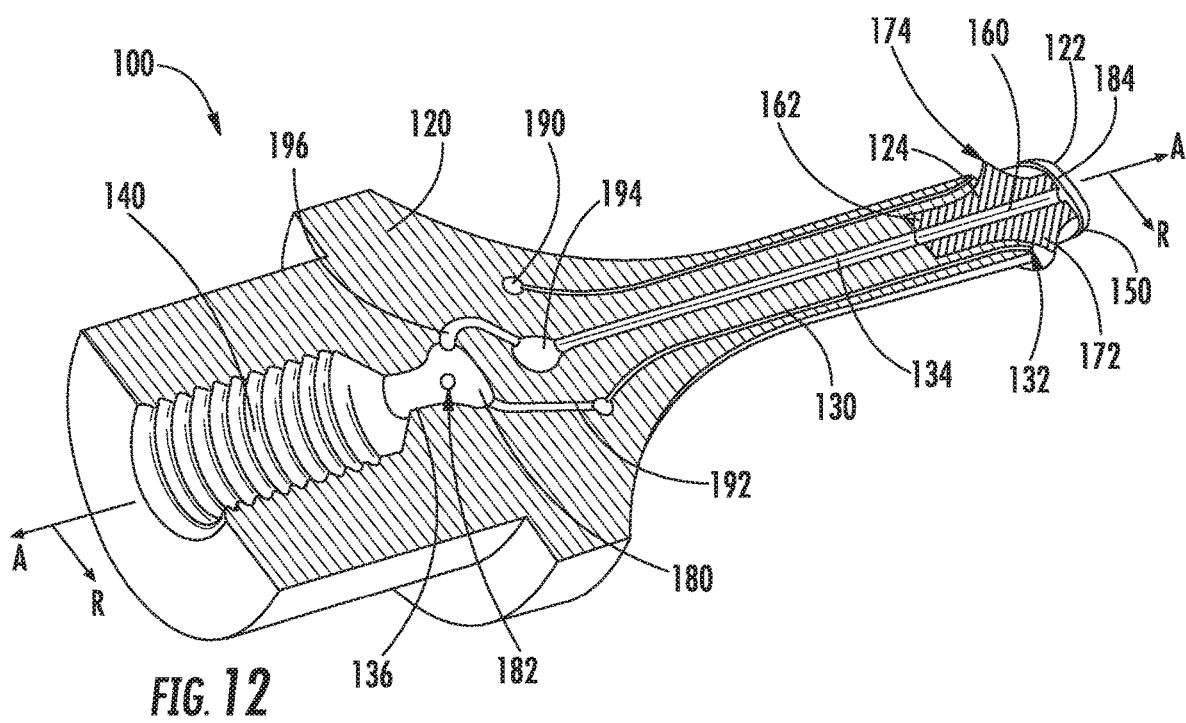
FIG. 12 provides a cross-sectional view of the exemplary burnishing tool of FIG. 11.

Referring now generally to FIGS. 11 through 14, still another exemplary embodiment of burnishing tool 100 is illustrated according to an exemplary embodiment of the present subject matter. As illustrated in FIG. 11 burnishing tool 100 is being used to burnish a turbine blade of a gas turbine engine. However, burnishing tool 100 may be used in any other suitable burnishing operation. As illustrated, lower nozzle 122 has a lower profile (e.g., a height as measured along the axial direction) in FIGS. 11 through 14, enabling a more compact burnishing tool capable of burnishing more difficult to reach areas of a component.

The various portions of burnishing tool 100 may be constructed using any suitable material, in any suitable geometry, density, and thickness, as needed to provide necessary structural support and burnishing fluid to facilitate the burnishing process. For example, burnishing element 124 of burnishing tool 100 may be formed from any hardened cutting material, such as carbide. In addition, upper nozzle 120 and lower nozzle 122 may be additively manufactured from any suitable metal, such as provided above to provide structural support for loads experienced by burnishing tool 100 during mounting, assembly, and operation, as well as allowing for internal fluid passageways. It should be appreciated that use of these materials are only exemplary and that other suitable materials and configurations are possible and within the scope of the present subject matter.

It should be appreciated that burnishing tool 100 is described herein only for the purpose of explaining aspects of the present subject matter. For example, burnishing tool 100 will be used herein to describe exemplary configurations, constructions, and methods of manufacturing burnishing tool 100. It should be appreciated that the additive manufacturing techniques discussed herein may be used to manufacture other burnishing tools for performing any burnishing process on any suitable component. Thus, the exemplary components and methods described herein are used only to illustrate exemplary aspects of the present subject matter and are not intended to limit the scope of the present disclosure in any manner.

Now that the construction and configuration of burnishing tool 100 according to several exemplary embodiments of the present subject matter has been presented, an exemplary method 300 for forming a burnishing tool according to an exemplary embodiment of the present subject matter is provided. Method 300 can be used by a manufacturer to form burnishing tool 100, or any other suitable burnishing tool. It should be appreciated that the exemplary method 300 is discussed herein only to describe exemplary aspects of the present subject matter, and is not intended to be limiting.

Figure 15:
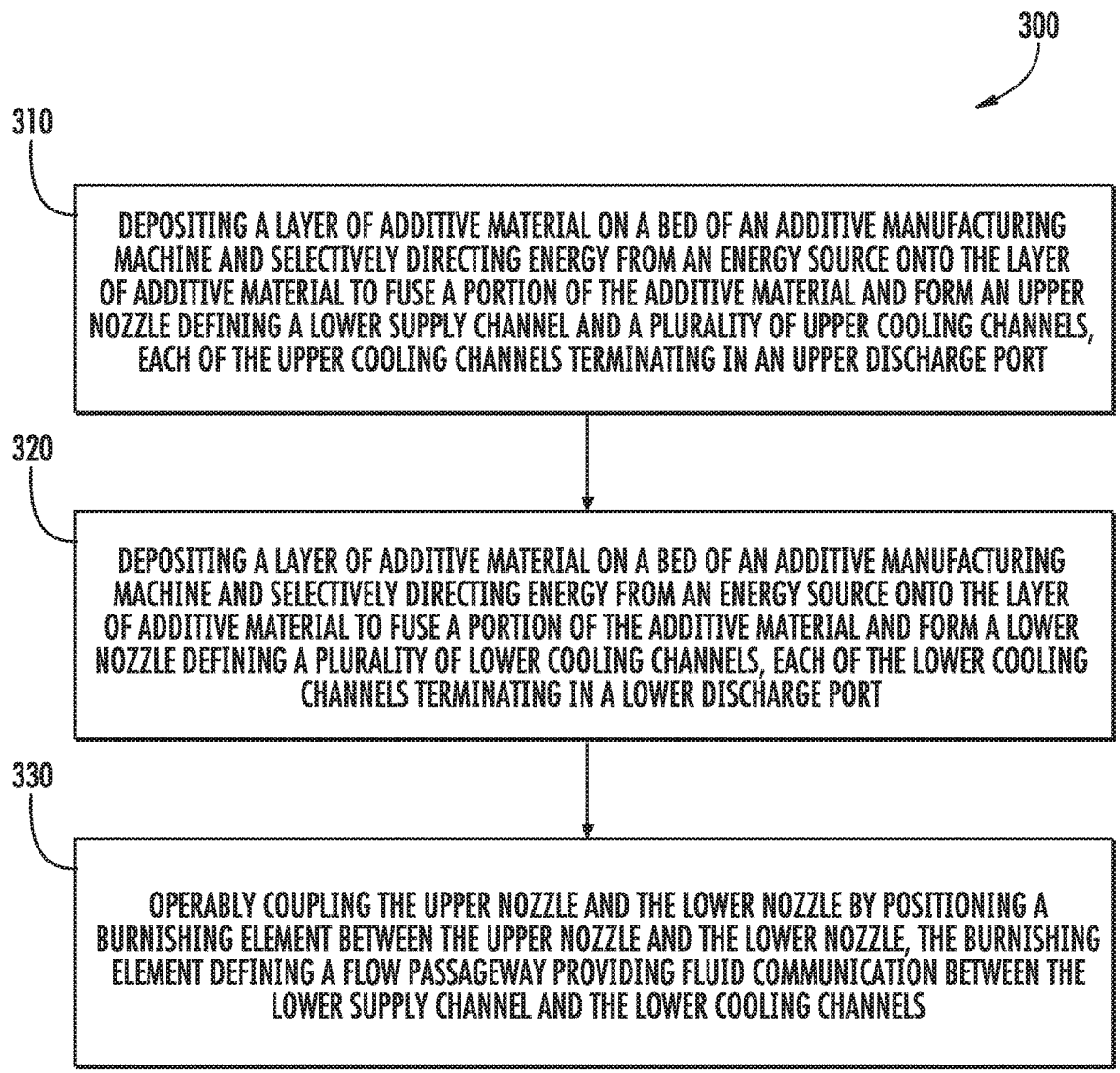
FIG. 15 is a method of manufacturing a burnishing tool according to an exemplary embodiment of the present subject matter.

Referring now to FIG. 15, method 300 includes, at step 310, depositing a layer of additive material on a bed of an additive manufacturing machine and selectively directing energy from an energy source onto the layer of additive material to fuse a portion of the additive material and form an upper nozzle. According to an exemplary embodiment, the upper nozzle defines a lower supply channel and a plurality of upper cooling channels, each of the upper cooling channels terminating in an upper discharge port. The upper nozzle may be integrally formed as a single monolithic component using any suitable additive manufacturing technique, such as described herein.

Method 300 further includes, at step 320, depositing a layer of additive material on a bed of an additive manufacturing machine and selectively directing energy from an energy source onto the layer of additive material to fuse a portion of the additive material and form a lower nozzle. According to an exemplary embodiment, the lower nozzle defines a plurality of lower cooling channels, each of the lower cooling channels terminating in a lower discharge port. The lower nozzle may be integrally formed as a single monolithic component using any suitable additive manufacturing technique, such as described herein.

Method 300 may further include, at step 330, operably coupling the upper nozzle and the lower nozzle by positioning a burnishing element between the upper nozzle and the lower nozzle. According to an exemplary embodiment, the burnishing element defines a flow passageway providing fluid communication between the lower supply channel and the lower cooling channels. In this manner, a flow of burnishing fluid may be supplied to the upper nozzle, e.g., from a burnishing fluid supply source in fluid communication with an inlet channel. The burnishing fluid may be distributed through the upper cooling channels and discharged from the upper discharge ports onto one side of the burnishing element and/or workpiece. In addition, the burnishing fluid may be distributed to the lower cooling channels through the lower supply channel and the flow passageway. The burnishing fluid may then be discharged from the lower discharge ports onto another side of the burnishing element and/or workpiece, resulting in an improved cooling and/or lubrication process.

FIG. 15 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using burnishing tool 100 as an example, it should be appreciated that these methods may be applied to manufacture any suitable burnishing tool or other tools that utilize burnishing fluid for temperature control.

An additively manufactured burnishing tool and a method for manufacturing that burnishing tool are described above. Notably, burnishing tool 100 may generally include performance-enhancing geometries, replaceable parts, internal fluid passageways and cavities, and improved burnishing fluid distribution configurations whose practical implementations are facilitated by an additive manufacturing process, as described below. These features may be introduced during the design of the burnishing tool, such that they may be easily integrated into the burnishing tool during the build process at little or no additional cost. Moreover, the upper nozzle and the lower nozzle, including various internal fluid passageways, reservoirs, and other features as described herein can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A burnishing tool, comprising:
a fluid supply for providing a flow of burnishing fluid;
an upper nozzle defining a lower supply channel and a plurality of upper cooling channels, each of the upper cooling channels terminating in an upper discharge port;
a lower nozzle defining a plurality of lower cooling channels, each of the lower cooling channels terminating in a lower discharge port; and
a burnishing element positioned between the upper nozzle and the lower nozzle and defining a working tip, the burnishing element defining a flow passageway providing fluid communication between the lower supply channel and the lower cooling channels, and wherein the upper discharge port and the lower discharge port direct the flow of burnishing fluid directly onto the working tip.

2. The burnishing tool of claim 1, wherein the upper nozzle defines:
an inlet channel in fluid communication with the fluid supply for receiving the flow of burnishing fluid; and
an upper distribution reservoir in fluid communication with the inlet channel, the upper distribution reservoir defining a plurality of outlets in fluid communication with the plurality of upper cooling channels and the lower supply channel for splitting the flow of burnishing fluid between the plurality of upper cooling channels and the lower supply channel.

3. The burnishing tool of claim 2, wherein the upper nozzle defines:
an annular distribution ring fluidly coupled to the plurality of upper cooling channels; and
a plurality of upper distribution channels providing fluid communication between the upper distribution reservoir and the annular distribution ring.

4. The burnishing tool of claim 2, wherein the upper nozzle defines:
a collection chamber fluidly coupled to the lower supply channel; and
a plurality of lower distribution channels providing fluid communication between the upper distribution reservoir and the collection chamber.

5. The burnishing tool of claim 1, wherein the lower nozzle defines:
a lower distribution reservoir in fluid communication with the flow passageway, the lower distribution reservoir defining a plurality of outlets in fluid communication with the plurality of lower cooling channels.

6. The burnishing tool of claim 1, wherein the burnishing element comprises:
a spindle defining an upper attachment portion for engaging the upper nozzle and a lower attachment portion for engaging the lower nozzle, the flow passageway being defined through the spindle; and
a burnishing body positioned around the spindle between the upper attachment portion and the lower attachment portion, the working tip extending outward from the spindle along a radial direction.

7. The burnishing tool of claim 6, wherein the burnishing body has a circular cross-section taken along a plane defined orthogonal to the axial direction.

8. The burnishing tool of claim 6, wherein the burnishing body has a non-circular cross-section taken along a plane defined orthogonal to the axial direction.

9. The burnishing tool of claim 8, wherein the upper nozzle comprises:
a first piece defining a threaded bore for engaging the spindle of the burnishing tool; and
a second piece positioned between the first piece and the burnishing body, the second piece defining a central bore and a non-circular cavity, wherein the spindle extends through the central bore and into the threaded bore and the non-circular cavity is complementary to and configured for receiving the burnishing body.

10. The burnishing tool of claim 9, wherein a first segment of each of the upper cooling channels is defined in the first piece and a second segment of each of the upper cooling channels is defined in the second piece, and wherein the upper nozzle further comprises:
an annular groove defined within the first piece or the second piece, the annular groove providing fluid communication between the first segments and the second segments.

11. The burnishing tool of claim 10, further comprising:
an annular seal positioned around the annular groove between the first piece and the second piece.

12. The burnishing tool of claim 1, wherein each of the upper discharge ports and the lower discharge ports define a discharge angle defined relative to an axial direction, wherein the discharge angle is selected to direct the flow of burnishing fluid onto the working tip of the burnishing element.

13. The burnishing tool of claim 1, wherein the upper nozzle defines a threaded surface for engaging a tool holder.

14. The burnishing tool of claim 1, wherein the burnishing element is a constructed of carbide and the upper nozzle and the lower nozzle are constructed of metal.

15. The burnishing tool of claim 1, wherein the upper nozzle is integrally formed as a single monolithic component and the lower nozzle is integrally formed as a single monolithic component.

16. The burnishing tool of claim 1, wherein the upper nozzle and the lower nozzle each comprise a plurality of layers formed by:
depositing a layer of additive material on a bed of an additive manufacturing machine; and
selectively directing energy from an energy source onto the layer of additive material to fuse a portion of the additive material.

17. A method for manufacturing a burnishing tool, the method comprising:
depositing a layer of additive material on a bed of an additive manufacturing machine and selectively directing energy from an energy source onto the layer of additive material to fuse a portion of the additive material and form an upper nozzle defining a lower supply channel and a plurality of upper cooling channels, each of the upper cooling channels terminating in an upper discharge port;
depositing a layer of additive material on a bed of an additive manufacturing machine and selectively directing energy from an energy source onto the layer of additive material to fuse a portion of the additive material and form a lower nozzle defining a plurality of lower cooling channels, each of the lower cooling channels terminating in a lower discharge port; and
positioning a burnishing element between the upper nozzle and the lower nozzle, the burnishing element defining a working tip and a flow passageway providing fluid communication between the lower supply channel and the lower cooling channels such that a flow of burnishing fluid may pass through the upper nozzle and the lower nozzle directly onto the working tip.

18. The method of claim 17, wherein the upper nozzle defines:
an inlet channel in fluid communication with a fluid supply for receiving the flow of burnishing fluid;
an upper distribution reservoir in fluid communication with the inlet channel, the upper distribution reservoir defining a plurality of outlets in fluid communication with the plurality of upper cooling channels and the lower supply channel for splitting the flow of burnishing fluid between the plurality of upper cooling channels and the lower supply channel; and
a lower distribution reservoir in fluid communication with the flow passageway, the lower distribution reservoir defining a plurality of outlets in fluid communication with the plurality of lower cooling channels.

19. The method of claim 17, wherein the upper nozzle defines:
an annular distribution ring fluidly coupled to the plurality of upper cooling channels;
a plurality of upper distribution channels providing fluid communication between the upper distribution reservoir and the annular distribution ring;
a collection chamber fluidly coupled to the lower supply channel; and
a plurality of lower distribution channels providing fluid communication between the upper distribution reservoir and the collection chamber.

20. The method of claim 17, wherein the upper nozzle is integrally formed as a single monolithic component and the lower nozzle is integrally formed as a single monolithic component.

* * * * *